(12) United States Patent
Kalina

(10) Patent No.: US 6,243,688 B1
(45) Date of Patent: *Jun. 5, 2001

(54) INTERNET-BASED CREDIT INTERCHANGE SYSTEM OF CONVERTING PURCHASE CREDIT AWARDS THROUGH CREDIT EXCHANGE SYSTEM FOR PURCHASE OF INVESTMENT VEHICLE

(76) Inventor: Dyan T. Kalina, 523 Canon View Trail, Topanga, CA (US) 90290

( * ) Notice: Subject to any disclaimer, the term of this patent is extended or adjusted under 35 U.S.C. 154(b) by 0 days.

This patent is subject to a terminal disclaimer.

(21) Appl. No.: 09/383,100

(22) Filed: Aug. 25, 1999

Related U.S. Application Data

(63) Continuation-in-part of application No. 08/839,467, filed on Apr. 1, 1997, now Pat. No. 5,970,480.

(51) Int. Cl.[7] .................................................. G06F 17/60
(52) U.S. Cl. ................................ 705/14; 705/37; 705/26; 705/27
(58) Field of Search ........................... 705/14, 26, 27, 705/37

(56) References Cited

U.S. PATENT DOCUMENTS

| 4,750,119 | 6/1988 | Cohen et al. . |
| 5,233,514 | 8/1993 | Ayyoubi et al. . |
| 5,297,026 | 3/1994 | Hoffman . |

(List continued on next page.)

FOREIGN PATENT DOCUMENTS

| 308224A2 | * | 3/1989 | (DE) | .............................. G06F/15/21 |
| 725953A1 | * | 7/1998 | (FR) | .............................. G06F/17/60 |

OTHER PUBLICATIONS

Carol Jouzaitis, Frequent Flier No Bonus for Airlines, Apr. 22, 1988, Chicago Tribune, p. 1.*
Anonymous, How to Profit from Merchandise Incentives, Sep. 1991, Bill Communications, p. 4–34.*
William M. Mercer Inc, William M Mercer Survey: Biotech Executives Highest Paid: Underscores Strength of Industry, Apr. 8, 1991.*

*Primary Examiner*—James P. Trammell
*Assistant Examiner*—Daniel Lastra
(74) *Attorney, Agent, or Firm*—Sonnenschein, Nath & Rosenthal

(57) ABSTRACT

An Internet-based purchase credit award interchange center is described which interfaces with a credit award exchange center for conversion of any form of merchant or purchase credit award resulting from customer purchase of goods or services to investment in a mutual fund and/or investment vehicle utilizing computer data processing methods. Preassigned purchase credit accumulations earned by a consumer are exchanged from a merchant or creditor through or combination of credit cards, co-branded credit cards, PIN cards, debit and smart cards, coupons, stamps, proof of purchase, rebates, or any form of purchase award of merchant or creditors choice for an investment in a mutual fund or other investment vehicle. A specific implementation is described wherein a credit card account having investment credit awards is issued through the Internet to a customer. While inputting information through the Internet necessary for establishing the credit card account, the customer also provides any information needed to authorize the purchase of investment vehicles on his or her behalf. Any forms that need to be signed by the customer to authorize purchase of the investment vehicles may be printed out by the customer. The customer may also select, via the Internet, particular investment vehicles out of a group of possible investment vehicles. Subsequent use of the credit card by the customer automatically results in accrual of credit award accumulations in the selected investment vehicle.

20 Claims, 3 Drawing Sheets

U.S. PATENT DOCUMENTS

| | | |
|---|---|---|
| 5,466,919 | 11/1995 | Hovakimian . |
| 5,471,669 | 11/1995 | Lidman . |
| 5,483,049 | 1/1996 | Schulze, Jr. . |
| 5,537,314 | 7/1996 | Kanter . |
| 5,621,640 | 4/1997 | Burke . |
| 5,774,870 | 6/1998 | Storey . |
| 5,806,045 * | 9/1998 | Biorge et al. ............................ 705/14 |
| 5,970,480 * | 10/1999 | Kalina ..................................... 705/37 |
| 5,983,196 * | 11/1999 | Wendkos ................................. 705/14 |
| 5,991,736 * | 11/1999 | Ferguson et al. ....................... 705/14 |

* cited by examiner

INTERNET-BASED CREDIT INTERCHANGE SYSTEM OF CONVERTING PURCHASE CREDIT AWARDS THROUGH CREDIT EXCHANGE SYSTEM FOR PURCHASE OF INVESTMENT VEHICLE

RELATED APPLICATIONS

This application is a Continuation-in-Part of U.S. application Ser. No. 08/839,467 filed Apr. 1, 1997, now U.S. Pat. No. 5,970,480.

DESCRIPTION OF RELATED ART

Due to proliferation of award programs, issuers will need to structure programs to minimize cost of rewards at the same time maximizing appeal to consumers, to win market share due to increasing competitive market. The key to customer and credit card holder retention and loyalty is immediate or near immediate gratification. The potential of earning an investment opportunity and possible appreciation of the issuer's reward can retain customers in an era when the costs to acquire new accounts are skyrocketing and where the effectiveness of new marketing is diminishing. They key today is offering a meaningful value-added proposition.

Airline frequent-flier programs and other reward programs are becoming so common customers are becoming used to rebate programs and are expecting them from merchants. Even though airline frequent-flier programs have been successful, the market is becoming saturated and consumers are becoming aware of frequent flier pitfalls such as frequent flier awards expiring, poor availability of seats and available flying times. These and other award programs involve a considerable accumulation period to earn a benefit, have a ceiling on the award, or encourage consumers to charge excessively.

There is a rising concern of backlash from consumer groups and government over what might be viewed as encouragement from creditors for consumers to stay in debt.

This is especially applicable for supermarkets, discount retailers and gasoline stations which provide essential goods and services. Patrons of these establishments would be good potential users of the invention and save money through potential appreciation of investment as people do grocery shopping and buy gasoline more than anything else, which would include low income and disadvantaged people, who are hard pressed to save for investment income.

Clearly, there is a need in this environment for having rewards/credits tailored to a particular market, to meet the various needs of consumers with no limit on accumulation periods, ceilings or expirations, but with greater competitive advantage to merchants, banks and other creditors, and, most importantly, for the consumer, potential appreciation of award through investment, thereby, effectively reducing the cost of interest on debt; amount of debt, with potential of gaining from debt used in the form of credit.

The parent application describes a method and system which fulfills this need. More specifically, the parent application is directed to describing methods and systems employing a purchase award account wherein purchase credit awards resulting from a purchase by a consumer using the purchase award account is converted into an ownership interest in an investment vehicle such as a stock, bond, mutual fund, money market fund, or insurance product. More specifically, a purchase credit award interchange center is described which interfaces with a credit award exchange center for converting any form of merchant or purchase credit award resulting from a customer purchase of goods and services into an interest in an investment vehicle. Pre-assigned purchase credit accumulations earned by the customer are exchanged from a merchant or creditor through a combination of credit card, co-branded credit card, PIN card, debit and smart cards, coupons, stamps, proof of purchases, rebates, or any other form of purchase award. In this manner, the customer accrues an interest in an investment vehicle, rather than merely earning a gift certificate, mileage award or the like.

The present application is directed to further improvements pertaining to systems and methods for establishing and processing purchase award accounts wherein purchase credit awards are exchangeable into investment vehicles and is directed in particular to Internet-based improvements.

SUMMARY OF THE INVENTION

A method is provided for establishing and processing a purchase award account wherein purchase credit awards resulting from a purchase by a consumer using the purchase award account is exchanged into an ownership interest in an investment vehicle. In accordance with the method, information is received from a consumer needed to establish the purchase award account, a purchase award account is established on behalf of the consumer. Thereafter, information is received pertaining to purchases made by the consumer using the purchase award account, the account of the consumer is credited with credit awards, and the credit awards are accumulated in the account. Upon the credit awards reaching a predetermined level, an ownership interest in the investment vehicle is then purchased on behalf of the consumer with the credit awards in the account. The investment vehicle is thereafter subject to appreciation or depreciation.

In an exemplary embodiment, the information from a consumer needed to establish the purchase award account is received over the Internet. Forms are provided via the Internet for the signature by the consumer to authorize purchase of investment vehicles on behalf of the consumer. The forms are printable by the consumer from a web site via the Internet. The consumer also selects, via the Internet, specific investment vehicles out of a group of predetermined vehicles. The investment vehicle may be a mutual fund, a bond, a stock, an insurance investment vehicle, a money market fund, an annuity investment vehicle or a real estate investment vehicle.

DETAILED DESCRIPTION OF EXEMPLARY EMBODIMENTS OF THE INVENTION

Figure 1:
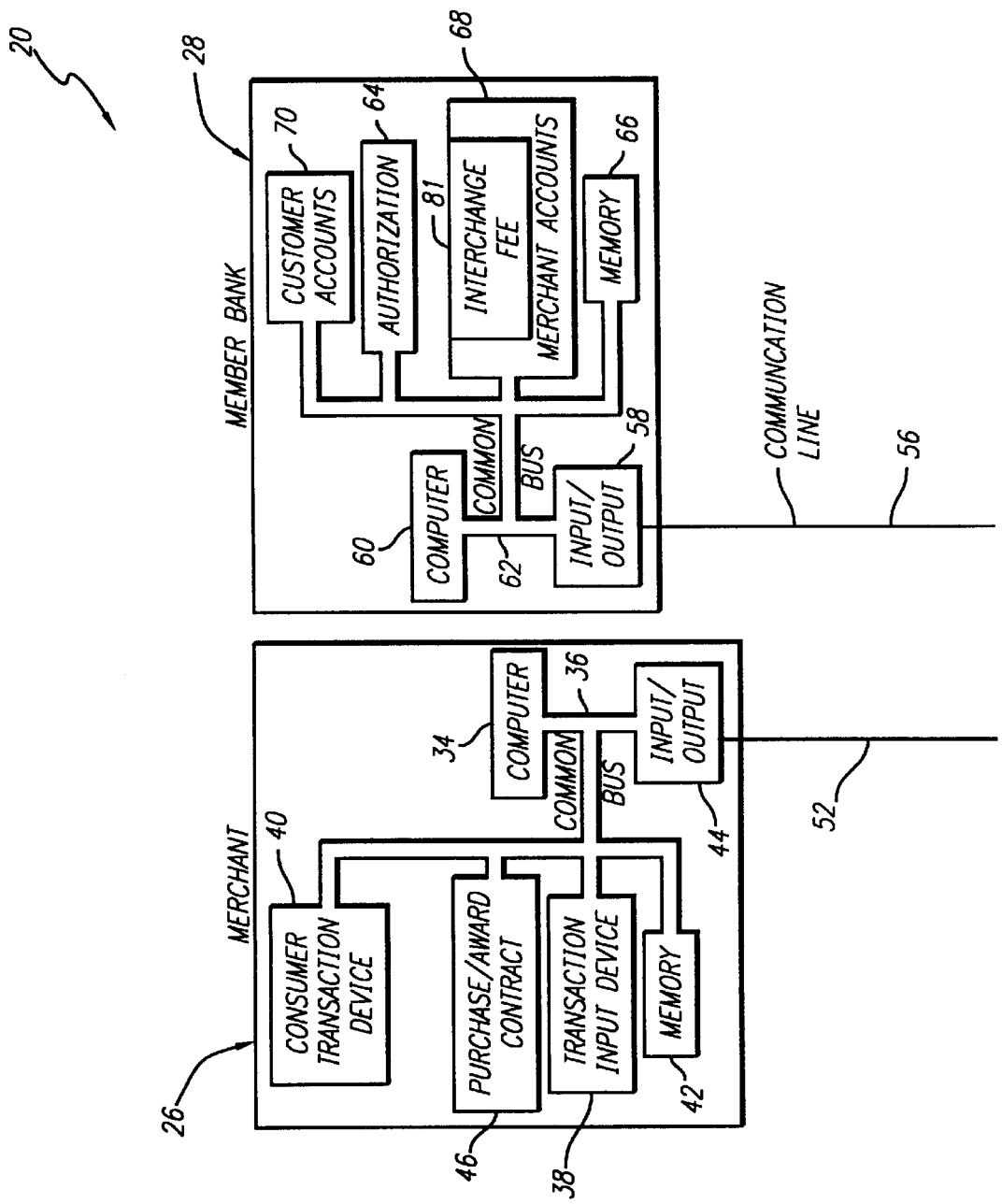
FIG. 1 is a block diagram of a purchase investment credit award interchange and credit award exchange system clearing consumer incurred awards from point of sale transaction communicated via merchant participant or consumer implementing methods of the invention in or on a data processing system for conversion to investment in a mutual fund and/or investment vehicle utilizing invention data processing methods.

FIG. 1 illustrates a purchase credit award interchange and credit award exchange system 20 which serves as a central system to initiate, receive and maintain credit award accounts rand contract terms from merchant 26, member bank 28, other banks 28A and other participants/creditors 30 to be cleared and forwarded to credit award exchange 24, for exchange into a mutual fund or other investment vehicle.

With reference to the figure, there is shown a purchase credit award interchange and credit award exchange system 20 having a central system comprising of credit interchange center 22 with credit award exchange 24 for communication with a plurality of merchants, banks and other participant/creditors. Each participant: merchant 26, banks 28-A; other participants/creditors 30 has a computer 34 which communicates over a common bus 36 connecting with transaction input device 38, a memory 42 and input/output device 44.

One embodiment includes a consumer transaction device 40 that allows a consumer to input additional information, such as a personal identification number, at point of sale.

In one embodiment, credit interchange center 22 initiates and secures investment credit award contract 74 with merchant 26, other participants/creditors 30, banks 28-A and member bank 28. Each contract is stored in memory 72 or central system main computer 50. Although various elements are shown separately in the figure for clarity, it is to be understood that many of these elements can be physically combined. For example, customer account 76 may reside in memory 72, which in turn may reside in central system main computer 50.

The following description of merchant transaction from point of sale to culmination of investment purchase includes all transactions whether from merchant 26 or other participants/creditors 30. In other words, in a preferred embodiment bank 28-A includes the same software, features, and elements as bank 28 and other participant/creditor30 includes the same software, features, and elements as merchant 26. Unless, according to award contract terms, one entity is optional or omitted, thereby, software would be programmed to interact with main computer 50 according to terms of participant award contract terms. In other words, on one embodiment, member bank 28 and non-member bank 28-A may convert interest paid by debtor to award credit for conversion to investment vehicle, thereby omitting interaction with merchant software. In another embodiment, a bank, mutual fund, or investment entity may exchange a revenue share by a bank, mutual fund or investment entity to investment award credit for conversion into an investment vehicle. In general, the system can be configured to handle a wide range of award accounts for awarding investment credits based upon a wide range of financial transactions with a variety of third parties, not limited to purchases from vendors. Examples of non-merchant transaction include the buying, selling or financing of real estate.

In a preferred embodiment, merchant 26 through transaction input device 38 at point of sale enters consumer transaction data which would contain, for example, merchant customer account number, customer name, amount credited, date, location of point of sale, items credited, and code number. If consumer data input is part of point of sale transaction, consumer transaction device 40 can be utilized and transaction data from either transaction input device 38 or consumer transaction device 40 may be stored in memory 42. Consumer transaction device 40 would be utilized by consumer in a physical act, such as inputting a personal identification number or swiping a form of award card. From memory 42, all transaction data will output to central system main computer 50 using input/output device 44 through communication line 52 to input/output device 54.

Merchant 26 and member bank 28 have assigned to them designated credit interchange account numbers. When sale/credit award transactions are received by central system main computer 50, memory 72 will match merchant 26 and member bank 28 designated account numbers to respective purchase credit award contract 74 stored in memory 72. Purchase award contract 74 utilizes an account number associated with the terms of contract for matching preassigned award credit per type of award vehicle used and credits customer account 76 with the proper amount of award credits.

Central system main computer 50, upon receipt of transaction data, communicates through communication line 56 to member bank 28, through input/output device 58 to bank computer 60, which interacts through common bus line 62 with merchant account 68, customer account 70 and authorization code 64 and accepts the transaction. Simultaneously, member bank 28 deducts interchange fee 81 from merchant account 68, sends interchange notification through common bus line 62 from memory 66 to input/output device 58 through communication line 56 to central system computer 50 to store in memory 72 as receiving and holding interchange fee 81 for transaction in interchange fee account 80. Central system main computer 50 now sends a command via communication line 56 to bank computer 60 to store in memory 66 consumer billing information and all further billing transactions. The manner in which finance charges, late fees, overdrawn fees, etc. are calculated and the factors and consideration applicable to such bank activities are known in the art and are outside the scope of the invention. Insofar as the interchange fee or revenue share is concerned, for purchases of goods or services from a merchant, an interchange fee is typically paid for by the merchant; revenue share by credit card bank or investment entity such as mutual fund, insurance company, etc. For buying, selling or financing real estate, the fee is paid for by the real estate agent or mortgage broker out of his or her commission. If the investment vehicle that is being acquired on behalf of the consumer is a mutual fund, the interchange fee or revenue share may be paid for by the issuer of the mutual fund. As can be appreciated, numerous arrangements for paying the interchange fee or providing the revenue share may be provided based upon the circumstances of the overall transaction and upon any applicable laws or regulations.

Upon completion of the billing transaction, credit interchange center 22 communicates to credit award exchange 24 which prepares and sends customer notice of proper authorizations and customer directives for signature per regulatory rules and regulations of investment vehicle. Upon return, customer directive is stored in customer account 76 awaiting conversion to investment vehicle upon accumulation of credits.

Central system main computer 50 functions in accordance with an operating program stored in memory 72 as to summing accumulating credit awards cleared through credit interchange center 22. When a preassigned award accumulation is reached, the data received by central system main computer 50 is sorted out by central system main computer 50 under control of an operating program located in memory 72. The customer account 76 number of the customer's award is located in memory 72. The award is converted to a cash value and an investment vehicle is purchased at investment center 82. The award customer is notified and data is transferred through common bus 78 into central system main computer 50 for monitoring customer investment account. A periodic statement is issued to the award customer showing account number, investment vehicle purchase, price paid and increment purchased, amount of accumulated credit awards used and amount of awards remaining. The periodic statement may also identify merchant 26 from whom credit award was awarded, how many credits were earned for items credited during the applicable period and how many award credit were used to purchase the investment vehicle.

Figures 1, 2:
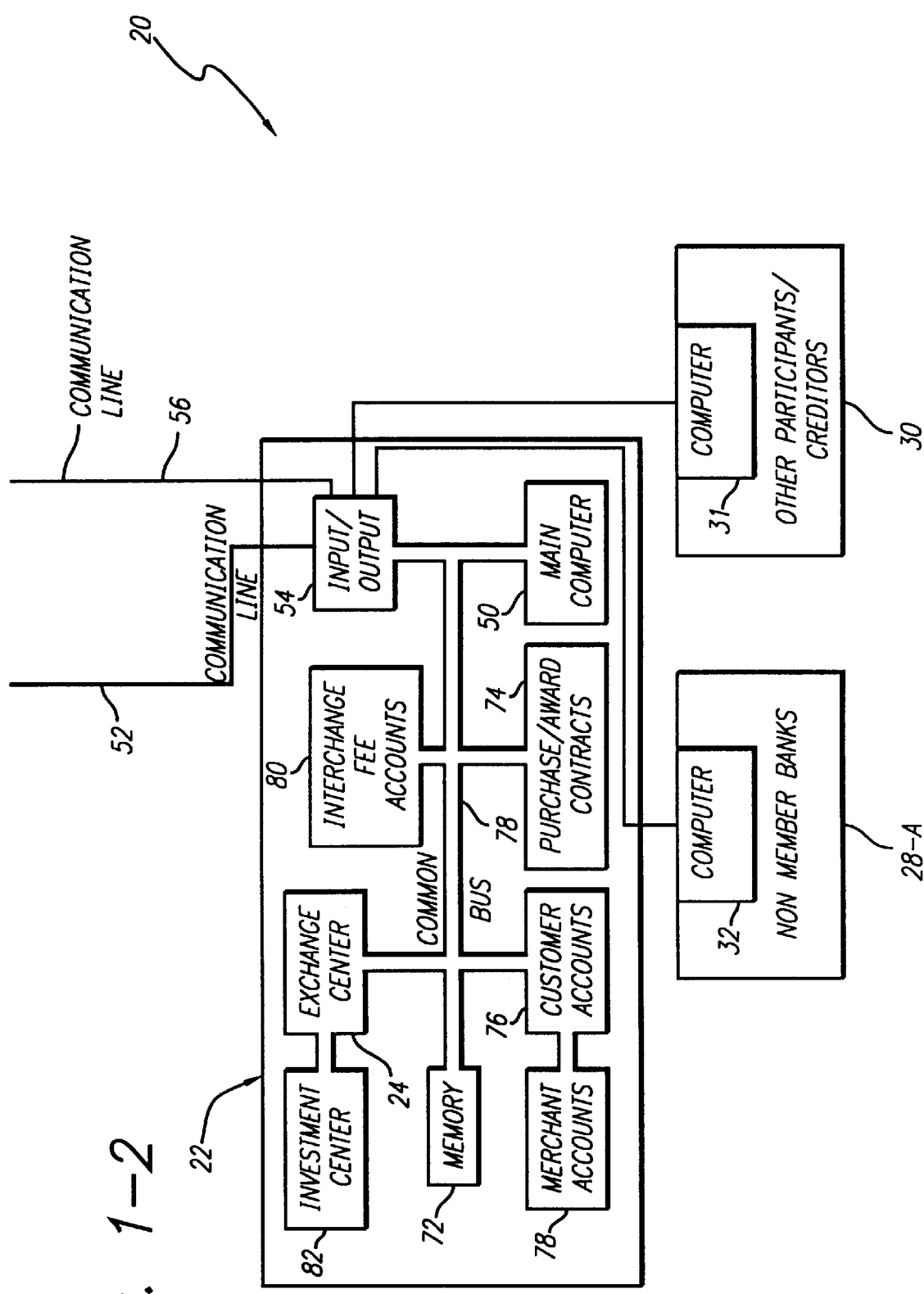
FIG. 2 is a flow chart illustrating an Internet-based method for establishing and processing a purchase award account, such as a credit card account, wherein the purchase award account provides for automatic accumulation of investment vehicle credits.
Figure 2:
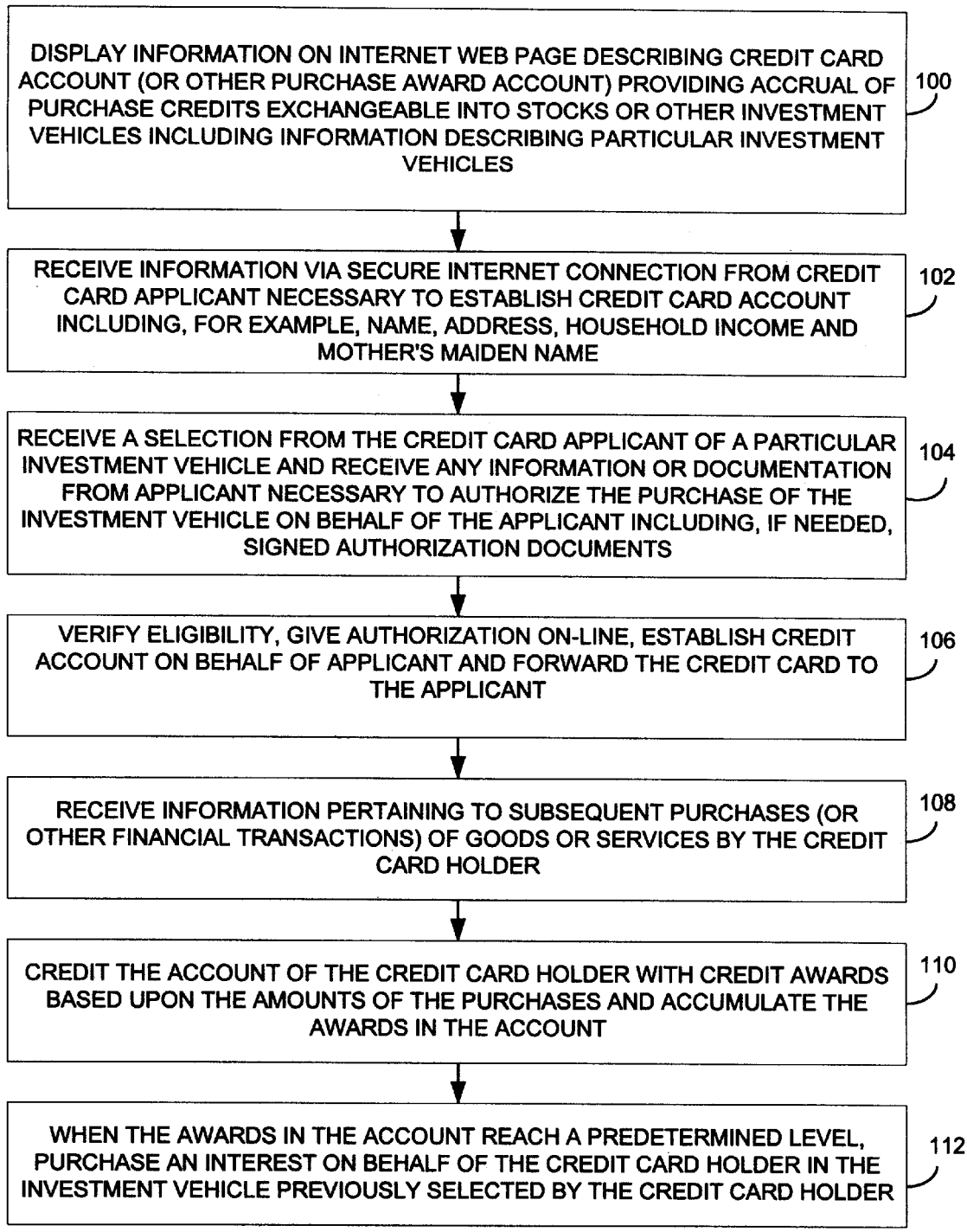

FIG. 2 illustrates an Internet-based method for establishing a credit card account or other purchase award account providing accrual of purchase credits exchangeable into stocks or other investment vehicles. At step 100, a central computer system such as the exchange system 20 of FIG. 1 displays information on an Internet web page describing the credit card account agreement. The web page also describes particular investment vehicles in which an award may be accrued using the account including, for example, stocks, bonds, mutual funds, money market fund, insurance products or real estate investments. The web page is accessible by the various potential applicants via any conventional web browser or the like. Preferably, links are provided on other web pages, such as merchant web pages, chat room web pages, affiliate marketing web pages and the like, to the Internet web page describing the credit card account agreement such that new potential customers will be directed to the account. Direct email to potential customers may also be employed to generate further customers.

If a potential applicant wishes to establish a credit card account at step 102, the applicant transmits information necessary to establish the credit card account via a secure Internet connection. The information may include, for example, the name, address, e-mail address and household income of the applicant as well as the applicant's mother's maiden name. Depending upon the particular requirements of the issuer of the credit card, additional information may also be required. At step 104, the applicant selects, via the web page, one or more particular investment vehicles to be associated with his or her account. Based upon the selected investment vehicles, the central computer presents a web page to the applicant indicating any additional information that may be required to permit the system to purchase an interest in the investment vehicle on behalf of the consumer. Depending upon the investment vehicle selected, the applicant may be required to sign various forms. If so, the forms are made available via the web page and the applicant merely prints out the forms, signs them, then returns via conventional mail. Other methods for obtaining the applicant's signature may also be employed including, for example, facsimile transmission of the documents, e-mail transmission of scanned documents, or transmission of a digital signature or the like.

In any case, once the applicant has provided the necessary information for establishing the account and has provided any documentation necessary to authorize purchase of the investment vehicle, the central system, at step 106, verifies the eligibility of the applicant. If eligible, the system establishes a purchase award account on behalf of the applicant and forwards a credit card to the applicant. The system preferably also transmits the credit card number directly to the applicant's e-mail address via a secure connection to permit the applicant to begin using the credit card immediately. Thereafter, the applicant makes various purchases of goods or services and, at step 108, the central system receives information pertaining to the purchases from the various merchants from which the goods or services are purchased.

For purchases made via the Internet, the web page of the merchant provides an icon identifying the subject credit card as well as, perhaps, icons identifying conventional credit cards. The credit card holder merely selects the credit card providing an accrual of investment credits via "point and click." Given that a customer can receive investment credits by selecting the new credit card, rather than one of the conventional credit cards, it is believed that the customer will typically select the new credit card over conventional credit cards. For this reason, it is also believed that merchants will typically include the icon associated with the new credit card to facilitate purchases with the new credit card. The Internet web page presented at step 100 may also be configured to allow merchants or others to apply to become participants or partners with the issuers of the credit card account or other purchase award account.

At step 110, the central system credits the account of the credit card holder (previously the credit card applicant) with credit awards based upon the amounts of the purchases and accumulates the awards in the account in the manner described above in connection with FIG. 1. At step 112, when the awards in the account reach a predetermined level, the central system purchases an interest on behalf of the credit card holder in the investment vehicle previously selected by the credit card holder. The purchase of the interest in the investment vehicle may be in accordance with the techniques described above in connection with FIG. 1. If the applicant selected two or more investment vehicles at the time of establishing the account, then a pro rata interest may be purchased on behalf of the customer in each of the investment vehicles. In other implementations, the credit card holder, at the time each purchase is made, specifies a particular investment vehicle in which investment credit awards are to be accrued.

Once an interest in an investment vehicle such as a stock or mutual fund has been purchased on behalf of the customer, the customer can then access the web page to download information on the investment, such as its current value or the like. The customer can also reinvest dividends or gains, withdraw funds or trade or transfer within funds. Depending upon the implementation, the customer may also be able to invest personal monies in the investment vehicle or otherwise commit further funds.

FIG. 2 has been described primarily in connection with establishing and processing a credit card account, however, the general method is also applicable to any of the other purchase accounts described above, such as debit accounts, co-branded credit card accounts, and the like.

While there have been shown and described and pointed out fundamental novel features of the invention as applied to embodiments thereof, it will be understood that various omissions and substitutions and changes in the form and details of the invention, as herein disclosed, may be made by those skilled in the art without departing from the spirit of the invention. It is expressly intended that all combinations of those elements and/or method steps which perform substantially the same function is substantially the same way to achieve the same results are within the scope of the invention. It is the intention, therefore, to be limited only as indicated by the scope of the claims appended hereto.

What is claimed is:

1. A method for establishing and processing a purchase award account wherein purchase credit awards resulting from a financial transaction made by a consumer using the purchase award account is exchanged into an ownership interest in an investment vehicle, the method comprising the steps of:

receiving information from a consumer needed to establish the purchase award account;

establishing the purchase award account on behalf of the consumer;

receiving information pertaining to financial transactions made by the consumer using the purchase award account;

crediting the account of the consumer with credit awards;

accumulating the credit awards in the account; and purchasing an ownership interest in the investment vehicle on behalf of the consumer with the credit awards in the account upon the credit awards reaching a predetermined level, the investment vehicle being subject to appreciation or depreciation.

2. The method of claim 1 wherein the step of receiving information from a consumer includes the step of receiving the information over the Internet.

3. The method of claim 2 wherein the step of receiving information from a consumer includes the step of providing forms for the signature by the consumer to authorize purchase of investment vehicles on behalf of the consumer, said forms being printable by the consumer from a web site via the Internet.

4. The method of claim 2 wherein the step of receiving information from a consumer includes the step of receiving a selection of a particular investment vehicle from the consumer via the Internet.

5. The method of claim 1 wherein the investment vehicle is selected from a group of investment vehicles including a mutual fund, a bond, a stock, an insurance investment vehicle, an annuity investment vehicle, a money market fund and a real estate investment vehicle.

6. The method of claim 1 wherein the step of purchasing the ownership interest in the investment vehicle comprises the steps of:

determining a current market value associated with the investment vehicle;

determining an amount of ownership interest that can be purchased in the investment vehicle based upon the accumulated credit awards; and converting the credit awards into the ownership interest in the investment vehicle.

7. The method of claim 1 wherein the purchase award account is a credit card account.

8. The method of claim 1 wherein the financial transaction is a purchase from a merchant.

9. A method for establishing and processing a purchase award account wherein purchase credit awards resulting from financial transaction by a consumer using the purchase award account is exchanged into an ownership interest in an investment vehicle, the method comprising the steps of:

receiving information from a consumer needed to establish the purchase award account;

establishing the purchase award account on behalf of the consumer;

receiving information pertaining to financial transactions made by the consumer with a third party using the purchase award account;

assessing the third party a fee associated with the purchase and depositing at least a portion of the fee in a fee account;

crediting a credit awards account of the consumer with credit awards associated with the purchase;

accumulating credit awards in the credit awards account;

upon the credit awards reaching a predetermined value, withdrawing at least a portion of the fee in the fee account; and purchasing an ownership interest in the investment vehicle on behalf of the consumer using the portion of the fees withdrawn from the interchange account, with the investment vehicle being subject to appreciation or depreciation.

10. The method of claim 9 wherein the step of receiving information from a consumer includes the step of receiving the information over the Internet.

11. The method of claim 10 wherein the step of receiving information from a consumer includes the step of providing forms for the signature by the consumer to authorize purchase of investment vehicles on behalf of the consumer, said forms being printable by the consumer from a web site via the Internet.

12. The method of claim 10 wherein the step of receiving information from a consumer includes the step of receiving a selection of a particular investment vehicle from the consumer via the Internet.

13. The method of claim 9 wherein the investment vehicle is selected from a group of investment vehicles including a mutual fund, a bond, a stock, a money market fund, an insurance investment vehicle, a real estate vehicle and an annuity investment vehicle.

14. The method of claim 9 wherein the step of purchasing the ownership interest in the investment vehicle comprises the steps of:

determining a current market value associated with the investment vehicle;

determining an amount of ownership interest that can be purchased in the investment vehicle based upon the accumulated credit awards; and converting the credit awards into the ownership interest in the investment vehicle.

15. The method of claim 9 wherein a plurality of financial transactions are made by the consumer, each resulting in a fee being assessed to the third party, the fees being accumulated, and wherein the purchase of the ownership interest is funded by at least a portion of the accumulated fees.

16. The method of claim 9 wherein the third party is a merchant, real estate broker, real estate agent, credit card bank or investment entity.

17. The method of claim 9 wherein the third party is a merchant and the fee is an interchange fee.

18. The method of claim 9 wherein the fee is a portion of a revenue share of the third party.

19. An electronic data processing device for establishing and processing a purchase award account wherein purchase credit awards resulting from a financial transaction by a consumer using the purchase award account is exchanged into an ownership interest in an investment vehicle, the device comprising:

means for receiving information from a consumer needed to establish the purchase award account;

means for establishing the purchase award account on behalf of the consumer;

means for receiving information pertaining to financial transaction made by the consumer using the purchase award account;

means for crediting an account of the consumer with the credit awards;

means for accumulating the credit awards in the accounts; and means for purchasing the ownership interest in the investment vehicle on behalf of the consumer with the credit awards in the accounts upon the credit awards in the account reaching a predetermined level, the investment vehicle being subject to appreciation or depreciation.

20. An electronic data processing device for establishing and processing a purchase award account wherein purchase credit awards resulting from a financial transaction by a consumer using the purchase award account is exchanged into an ownership interest in an investment vehicle, the device comprising:

an account establishing unit for receiving information from a consumer needed to establish the purchase award account, establishing the purchase award account on behalf of the consumer;

an account processing unit for receiving information pertaining to financial transaction made by the consumer using the purchase award account and for crediting an account of the consumer with the credit awards;

a credit award accumulation unit for accumulating the credit awards in the accounts; and an investment vehicle purchase processing unit for purchasing the ownership interest in the investment vehicle on behalf of the consumer with the credit awards in the accounts upon the credit awards in the account reaching a predetermined level, the investment vehicle being subject to appreciation or depreciation.

* * * * *